US012773673B2

(12) United States Patent
Lindberg et al.

(10) Patent No.: US 12,773,673 B2
(45) **Date of Patent: *Oct. 27, 2026**

(54) SYSTEM AND METHOD FOR MAGMA-DRIVEN THERMOCHEMICAL PROCESSES

(71) Applicant: EnhancedGEO, LLC, St. Petersburg, FL (US)

(72) Inventors: Greg Lindberg, St. Petersburg, FL (US); Kimberly C. Conner, St. Petersburg, FL (US)

(73) Assignee: Enhanced GEO Holdings LLC, Thonotosassa, FL (US)

(*) Notice: Subject to any disclaimer, the term of this patent is extended or adjusted under 35 U.S.C. 154(b) by 190 days.

This patent is subject to a terminal disclaimer.

(21) Appl. No.: 18/593,425

(22) Filed: Mar. 1, 2024

(65) Prior Publication Data

US 2024/0246055 A1 Jul. 25, 2024

Related U.S. Application Data

(63) Continuation of application No. 17/976,159, filed on Oct. 28, 2022, now Pat. No. 11,918,967.

(Continued)

(51) Int. Cl.
*B01J 19/00* (2006.01)
*F24T 50/00* (2018.01)

(52) U.S. Cl.
CPC ........... *B01J 19/0013* (2013.01); *F24T 50/00* (2018.05); *B01J 2208/0053* (2013.01); *B01J 2219/00103* (2013.01)

(58) Field of Classification Search
CPC .... B01J 19/00; B01J 19/0006; B01J 19/0013; B01J 2208/00; B01J 2208/00008;
(Continued)

(56) References Cited

U.S. PATENT DOCUMENTS

| | | | |
|---|---|---|---|
| 227,908 | A | 5/1880 | Magill |
| 1,043,129 | A | 11/1912 | Murphy |

(Continued)

FOREIGN PATENT DOCUMENTS

| | | | |
|---|---|---|---|
| AU | 2018308861 | A1 | 1/2020 |
| AU | 2017268378 | B2 | 9/2021 |

(Continued)

OTHER PUBLICATIONS

Behzadi et al., Thermoeconomic analysis of a hybrid PVT solar system integrated with double effect absorption chiller for cooling/hydrogen production; Energy Equipment andSystems, vol. 6, Issue 4—Serial No. 4 (Dec. 2018), p. 413-427.

(Continued)

*Primary Examiner* — Natasha E Young
(74) *Attorney, Agent, or Firm* — Kenneth M. Whitcomb

(57) ABSTRACT

A method for carrying out a thermochemical process includes injecting one or more feed streams into a reaction chamber. The reaction chamber is maintained at a reaction temperature using heat obtained directly from a subterranean heat source. The method includes maintaining the one or more feed streams in the reaction chamber for a residence (Continued)

time to form one or more product streams from the one or more feed streams. The one or more product streams are removed from the reaction chamber.

20 Claims, 12 Drawing Sheets

Related U.S. Application Data

(60) Provisional application No. 63/405,276, filed on Sep. 9, 2022.

(58) Field of Classification Search
CPC ...... B01J 2208/00017; B01J 2208/0053; B01J 2219/00–00103; C01B 3/00; C01B 3/02; C01B 3/04; C01B 3/042; C01B 2203/00; C01B 2203/06; C01B 2203/068; C01C 1/00–0405; C10G 2/00–32; F24T 10/00; F24T 10/30; F24T 50/00
See application file for complete search history.

(56) References Cited

U.S. PATENT DOCUMENTS

| | | | | |
|---|---|---|---|---|
| 1,382,255 | A | 6/1921 | Thomson et al. | |
| 1,853,351 | A | 4/1932 | Hayes | |
| 1,882,314 | A | 10/1932 | Burt | |
| 2,299,548 | A | 10/1942 | Maier | |
| 2,618,342 | A | 11/1952 | Meyer | |
| 2,756,139 | A | 7/1956 | Brooks et al. | |
| 2,777,398 | A | 1/1957 | Carpenter | |
| 2,918,259 | A | 12/1959 | Bus, Sr. | |
| 2,929,612 | A | 3/1960 | Bus, Sr. | |
| 3,061,336 | A | 10/1962 | Waggener | |
| 3,150,962 | A | 9/1964 | Pearson | |
| 3,280,923 | A | 10/1966 | Muench | |
| 3,398,794 | A | 8/1968 | Fox, Jr. | |
| 3,459,953 | A | 8/1969 | Brauser et al. | |
| 3,498,381 | A | 3/1970 | Earlougher, Jr. | |
| 3,508,412 | A | 4/1970 | Yearout | |
| 3,606,173 | A | 9/1971 | Rowland | |
| 3,613,806 | A | 10/1971 | Malott | |
| 3,757,516 | A | 9/1973 | McCabe | |
| 3,765,477 | A | 10/1973 | Van | |
| 3,864,208 | A | 2/1975 | Van Huisen | |
| 3,941,511 | A | 3/1976 | Morgan | |
| 3,950,949 | A | 4/1976 | Martin et al. | |
| 3,957,108 | A | 5/1976 | Van Huisen | |
| 3,967,675 | A | 7/1976 | Georgii | |
| 4,043,129 | A | 8/1977 | McCabe et al. | |
| 4,047,093 | A | 9/1977 | Levoy | |
| 4,054,176 | A | 10/1977 | Van Huisen | |
| 4,057,108 | A | 11/1977 | Broussard | |
| 4,116,285 | A | 9/1978 | Guerber | |
| 4,140,184 | A | 2/1979 | Bechtold et al. | |
| 4,171,019 | A | 10/1979 | Cole | |
| 4,286,651 | A | 9/1981 | Steiger et al. | |
| 4,439,213 | A | 3/1984 | Frey et al. | |
| 4,492,083 | A | 1/1985 | McCabe et al. | |
| 4,497,370 | A | 2/1985 | Breslin | |
| 4,511,461 | A | 4/1985 | Kruyer | |
| 4,642,987 | A | 2/1987 | Csorba et al. | |
| 4,665,705 | A | 5/1987 | Bonham, Jr. | |
| 4,776,169 | A | 10/1988 | Coles, Jr. | |
| 4,929,348 | A | 5/1990 | Rice | |
| 4,945,947 | A | 8/1990 | Westra et al. | |
| 4,999,097 | A | 3/1991 | Sadoway | |
| 5,094,746 | A | 3/1992 | Bush | |
| 5,143,150 | A | 9/1992 | Johnston | |
| 5,490,398 | A | 2/1996 | Cline | |
| 5,513,573 | A | 5/1996 | Sutton | |
| 5,515,679 | A | 5/1996 | Shulman | |
| 5,661,977 | A | 9/1997 | Shnell | |
| 5,860,279 | A | 1/1999 | Bronicki et al. | |
| 5,911,684 | A | 6/1999 | Shnell | |
| 5,921,320 | A | 7/1999 | Shulyatikov et al. | |
| 6,237,404 | B1 | 5/2001 | Crary et al. | |
| 6,708,494 | B1 | 3/2004 | Hamann | |
| 7,124,584 | B1 | 10/2006 | Wetzel et al. | |
| 7,597,138 | B1 | 10/2009 | Koenig | |
| 8,011,450 | B2 | 9/2011 | Krueger et al. | |
| 8,012,318 | B2 | 9/2011 | Marsden et al. | |
| 8,047,285 | B1 * | 11/2011 | Smith | E21B 21/103 166/305.1 |
| 8,201,409 | B1 | 6/2012 | Zakiewicz | |
| 8,522,887 | B1 | 9/2013 | Madison | |
| 8,524,787 | B2 | 9/2013 | Ermolaev et al. | |
| 8,701,432 | B1 | 4/2014 | Olson | |
| 8,734,546 | B2 | 5/2014 | McAlister | |
| 9,006,298 | B2 | 4/2015 | Leviness et al. | |
| 9,028,171 | B1 | 5/2015 | Seldner | |
| 9,108,858 | B2 | 8/2015 | McDonald et al. | |
| 9,150,423 | B2 | 10/2015 | Hosono et al. | |
| 9,181,931 | B2 | 11/2015 | McBay | |
| 9,182,149 | B2 | 11/2015 | Gilaberte et al. | |
| 9,298,756 | B1 | 3/2016 | Johnson | |
| 9,359,271 | B2 | 6/2016 | Leviness et al. | |
| 9,388,797 | B2 | 7/2016 | Bronicki | |
| 9,541,309 | B2 | 1/2017 | Colwell | |
| 9,574,551 | B2 | 2/2017 | Parrella, Sr. et al. | |
| 9,650,313 | B2 | 5/2017 | Tippet et al. | |
| 9,738,835 | B2 | 8/2017 | Schrauwen | |
| 9,765,605 | B2 | 9/2017 | Williamson et al. | |
| 10,017,395 | B2 | 7/2018 | Kageyama et al. | |
| 10,018,026 | B2 | 7/2018 | McBay | |
| 10,058,848 | B2 | 8/2018 | Lipiec et al. | |
| 10,131,545 | B2 | 11/2018 | Sekine et al. | |
| 10,173,202 | B2 | 1/2019 | Hosono et al. | |
| 10,203,162 | B2 | 2/2019 | Yokomine et al. | |
| 10,208,253 | B2 | 2/2019 | McNamara et al. | |
| 10,279,306 | B2 | 5/2019 | Gebald et al. | |
| 10,322,940 | B2 | 6/2019 | Hosono et al. | |
| 10,330,348 | B2 | 6/2019 | McBay | |
| 10,344,233 | B2 | 7/2019 | Lucas et al. | |
| 10,358,604 | B2 | 7/2019 | Harris et al. | |
| 10,710,049 | B2 | 7/2020 | Mikhajlov et al. | |
| 10,745,625 | B2 | 8/2020 | Dogterom et al. | |
| 10,759,668 | B2 | 9/2020 | Hosono et al. | |
| 10,787,894 | B2 | 9/2020 | McBay | |
| 10,792,645 | B2 | 10/2020 | Hosono et al. | |
| 10,914,293 | B2 | 2/2021 | McBay | |
| 10,954,924 | B2 | 3/2021 | Moncarz et al. | |
| 10,974,969 | B2 | 4/2021 | Hu et al. | |
| 11,131,484 | B2 | 9/2021 | Mcbay | |
| 11,235,310 | B2 | 2/2022 | Hosono et al. | |
| 11,286,169 | B2 | 3/2022 | Beach et al. | |
| 11,325,105 | B2 | 5/2022 | Beach et al. | |
| 11,584,888 | B2 | 2/2023 | Mleczko et al. | |
| 11,841,172 | B2 | 12/2023 | Lindberg et al. | |
| 11,852,383 | B2 | 12/2023 | Lindberg et al. | |
| 11,897,828 | B1 | 2/2024 | Lindberg et al. | |
| 11,905,797 | B2 | 2/2024 | Lindberg et al. | |
| 11,905,814 | B1 | 2/2024 | Smith et al. | |
| 11,913,679 | B1 | 2/2024 | Lindberg et al. | |
| 11,918,967 | B1 * | 3/2024 | Lindberg | C01C 1/0405 |
| 12,060,765 | B1 | 8/2024 | Stone et al. | |
| 12,209,776 | B2 | 1/2025 | Lindberg et al. | |
| 2002/0104328 | A1 | 8/2002 | DiFoggio | |
| 2003/0005698 | A1 | 1/2003 | Keller | |
| 2003/0145592 | A1 | 8/2003 | Stratford | |
| 2004/0084182 | A1 | 5/2004 | Edgar et al. | |
| 2004/0131488 | A1 | 7/2004 | Locher | |
| 2004/0265158 | A1 | 12/2004 | Boyapati et al. | |
| 2006/0026961 | A1 | 2/2006 | Bronicki | |
| 2006/0065545 | A1 | 3/2006 | Balan et al. | |
| 2006/0123952 | A1 | 6/2006 | Wilson et al. | |
| 2006/0180537 | A1 | 8/2006 | Loftis et al. | |
| 2006/0277917 | A1 | 12/2006 | Hsu | |
| 2007/0079617 | A1 | 4/2007 | Farmer et al. | |
| 2007/0151244 | A1 | 7/2007 | Gurin | |
| 2007/0289863 | A1 | 12/2007 | Manousiouthakis et al. | |
| 2008/0213157 | A1 | 9/2008 | McGrady et al. | |
| 2008/0216478 | A1 | 9/2008 | Cherry | |

(56) References Cited

U.S. PATENT DOCUMENTS

| | | | |
|---|---|---|---|
| 2008/0283411 | A1 | 11/2008 | Eastman et al. |
| 2009/0014336 | A1 | 1/2009 | Olah et al. |
| 2009/0120288 | A1 | 5/2009 | Lackner et al. |
| 2009/0183879 | A1 | 7/2009 | Cox |
| 2009/0226308 | A1 | 9/2009 | Vandor |
| 2009/0227185 | A1 | 9/2009 | Summers et al. |
| 2009/0321323 | A1 | 12/2009 | Sharma et al. |
| 2010/0025260 | A1 | 2/2010 | Naterer et al. |
| 2010/0045042 | A1 | 2/2010 | Hinders et al. |
| 2010/0089645 | A1 | 4/2010 | Trinh et al. |
| 2010/0269501 | A1 | 10/2010 | Parrella |
| 2011/0167819 | A1 | 7/2011 | Lakic |
| 2011/0232858 | A1 | 9/2011 | Hara |
| 2012/0144829 | A1 | 6/2012 | Wiggs et al. |
| 2012/0175077 | A1 | 7/2012 | Lehmann et al. |
| 2012/0237440 | A1 | 9/2012 | Kodama et al. |
| 2013/0101492 | A1 | 4/2013 | McAlister |
| 2013/0153399 | A1 | 6/2013 | McAlister |
| 2013/0232973 | A1 | 9/2013 | McBay |
| 2013/0234444 | A1 | 9/2013 | Rogers et al. |
| 2013/0283791 | A1 | 10/2013 | Riley |
| 2013/0333383 | A1 | 12/2013 | Schwarck |
| 2013/0336879 | A1 | 12/2013 | Yamazaki |
| 2014/0010742 | A1 | 1/2014 | Hanna et al. |
| 2014/0026602 | A1 | 1/2014 | Yabase et al. |
| 2014/0047836 | A1 | 2/2014 | Parrella |
| 2014/0205519 | A1 | 7/2014 | Shaw et al. |
| 2014/0262137 | A1 | 9/2014 | McBay |
| 2014/0284045 | A1 | 9/2014 | McBay |
| 2014/0309936 | A1 | 10/2014 | Abbassian et al. |
| 2015/0027721 | A1 | 1/2015 | Shreider et al. |
| 2015/0033745 | A1 | 2/2015 | Bastian, II et al. |
| 2015/0033793 | A1 | 2/2015 | Griffiths |
| 2015/0114639 | A1 | 4/2015 | Williamson et al. |
| 2015/0122453 | A1 | 5/2015 | Colwell |
| 2015/0128931 | A1 | 5/2015 | Joshi et al. |
| 2015/0174522 | A1 | 6/2015 | Eisenberger et al. |
| 2015/0300327 | A1 | 10/2015 | Sweatman et al. |
| 2015/0361833 | A1 | 12/2015 | Hinders et al. |
| 2015/0368565 | A1 | 12/2015 | Schrauwen |
| 2015/0377211 | A1 | 12/2015 | Occhiello |
| 2016/0097376 | A1 | 4/2016 | Wasyluk et al. |
| 2016/0115945 | A1 | 4/2016 | Barsi et al. |
| 2016/0123116 | A1 | 5/2016 | Randle et al. |
| 2016/0194767 | A1 | 7/2016 | Mulder |
| 2016/0251953 | A1 | 9/2016 | Samuel et al. |
| 2016/0312371 | A1 | 10/2016 | Kamei et al. |
| 2016/0363350 | A1 | 12/2016 | Tahara |
| 2017/0106331 | A1 | 4/2017 | Aronu et al. |
| 2017/0113184 | A1 | 4/2017 | Eisenberger |
| 2017/0253492 | A1 | 9/2017 | Beach et al. |
| 2017/0260829 | A1 | 9/2017 | Aadnøy |
| 2017/0268803 | A1 | 9/2017 | Cauchy |
| 2018/0010049 | A1 | 1/2018 | Tenore et al. |
| 2018/0016872 | A1 | 1/2018 | Randle |
| 2018/0106138 | A1 | 4/2018 | Randolph |
| 2018/0112916 | A1 | 4/2018 | Jia |
| 2018/0155638 | A1 | 6/2018 | Al-Ghamdi et al. |
| 2018/0224164 | A1 | 8/2018 | Lakic |
| 2018/0224215 | A1 | 8/2018 | Thiers et al. |
| 2019/0032446 | A1 | 1/2019 | Gronning |
| 2019/0055930 | A1 | 2/2019 | Muir et al. |
| 2019/0078423 | A1 | 3/2019 | Haci |
| 2019/0093017 | A1 | 3/2019 | Zhu |
| 2019/0157074 | A1 | 5/2019 | Delmas et al. |
| 2019/0178391 | A1 | 6/2019 | Gottlieb et al. |
| 2019/0264978 | A1 | 8/2019 | Van Amelsvoort et al. |
| 2019/0359894 | A1 | 11/2019 | Heidel et al. |
| 2019/0372137 | A1 | 12/2019 | Planque et al. |
| 2019/0390660 | A1 | 12/2019 | McBay |
| 2020/0011151 | A1 | 1/2020 | Toews et al. |
| 2020/0040267 | A1 | 2/2020 | Van Willigenburg et al. |
| 2020/0072199 | A1 | 3/2020 | Fontana et al. |
| 2020/0080771 | A1 | 3/2020 | Cooper |
| 2020/0086273 | A1 | 3/2020 | Medoff et al. |
| 2020/0131446 | A1 | 4/2020 | Wohaibi et al. |
| 2020/0200438 | A1 | 6/2020 | McBay |
| 2020/0231455 | A1 | 7/2020 | Beach et al. |
| 2020/0325030 | A1 | 10/2020 | Cussler et al. |
| 2020/0353518 | A1 | 11/2020 | Chandran et al. |
| 2021/0025241 | A1 | 1/2021 | Crichlow |
| 2021/0025265 | A1 | 1/2021 | Randolph |
| 2021/0025623 | A1 | 1/2021 | Holtzman |
| 2021/0087472 | A1 | 3/2021 | Garcia-Perez et al. |
| 2021/0114005 | A1 | 4/2021 | Tao et al. |
| 2021/0122656 | A1 | 4/2021 | Willberg et al. |
| 2021/0172266 | A1 | 6/2021 | Dietz et al. |
| 2021/0207670 | A1 | 7/2021 | Qi et al. |
| 2021/0230391 | A1 | 7/2021 | Parrott et al. |
| 2021/0262317 | A1 | 8/2021 | Gravois |
| 2021/0270496 | A1 | 9/2021 | Holtzman |
| 2021/0348489 | A1 | 11/2021 | O'Malley et al. |
| 2021/0371990 | A1 | 12/2021 | Amaya et al. |
| 2021/0387135 | A1 | 12/2021 | Dubois et al. |
| 2021/0404439 | A1 | 12/2021 | Kinsella |
| 2022/0034552 | A1 | 2/2022 | Sai et al. |
| 2022/0049592 | A1 | 2/2022 | McBay |
| 2022/0099367 | A1 | 3/2022 | Krishnamurthy et al. |
| 2022/0128298 | A1 | 4/2022 | Thomas et al. |
| 2022/0154978 | A1 | 5/2022 | McBay |
| 2022/0290053 | A1 | 9/2022 | Mleczko et al. |
| 2022/0306949 | A1 | 9/2022 | Nierode et al. |
| 2023/0022441 | A1 | 1/2023 | Deng et al. |
| 2023/0098572 | A1 | 3/2023 | Klussmann et al. |
| 2023/0114197 | A1 | 4/2023 | Hughes |
| 2023/0130169 | A1 | 4/2023 | McIntyre |
| 2023/0203386 | A1 | 6/2023 | Nierode et al. |
| 2023/0272946 | A1 | 8/2023 | Lindberg et al. |
| 2023/0272947 | A1 | 8/2023 | Lindberg et al. |
| 2023/0296086 | A1 | 9/2023 | Lindberg et al. |
| 2023/0304705 | A1 | 9/2023 | Lindberg et al. |
| 2023/0349265 | A1 | 11/2023 | Lindberg et al. |
| 2024/0024815 | A1 | 1/2024 | Rousselet et al. |
| 2024/0271489 | A1 | 8/2024 | Lindberg et al. |
| 2024/0271543 | A1 | 8/2024 | Lindberg et al. |
| 2024/0271828 | A1 | 8/2024 | Lindberg et al. |
| 2024/0271829 | A1 | 8/2024 | Lindberg et al. |
| 2024/0271832 | A1 | 8/2024 | Lindberg et al. |
| 2024/0279825 | A1 | 8/2024 | Krishnamurthy et al. |
| 2024/0295346 | A1 | 9/2024 | Lindberg et al. |
| 2025/0059340 | A1 | 2/2025 | Lindberg et al. |
| 2025/0059341 | A1 | 2/2025 | Lindberg et al. |
| 2025/0059342 | A1 | 2/2025 | Lindberg et al. |
| 2025/0059343 | A1 | 2/2025 | Lindberg et al. |
| 2025/0122771 | A1 | 4/2025 | Steele |
| 2025/0179890 | A1 | 6/2025 | Witte et al. |
| 2025/0230371 | A1 | 7/2025 | Conner et al. |

FOREIGN PATENT DOCUMENTS

| | | | |
|---|---|---|---|
| AU | 2016398360 | B2 | 1/2022 |
| CA | 2679905 | A1 | 3/2011 |
| CN | 204371248 | U | 6/2015 |
| CN | 105148824 | A | 12/2015 |
| CN | 106837176 | A | 6/2017 |
| CN | 107326195 | A | 11/2017 |
| CN | 107675211 | A | 2/2018 |
| CN | 108952650 | A | 12/2018 |
| CN | 112604697 | A | 4/2021 |
| CN | 113494273 | A | 10/2021 |
| CN | 113562692 | A | 10/2021 |
| CN | 216741858 | U | 6/2022 |
| EP | 0236640 | A1 | 9/1987 |
| EP | 0326736 | A2 | 8/1989 |
| EP | 2792010 | B1 | 1/2018 |
| EP | 3472110 | A1 | 4/2019 |
| EP | 3583321 | A1 | 12/2019 |
| GB | 544112 | A | 3/1942 |
| GB | 2592695 | A | 9/2021 |
| GB | 2615913 | A | 8/2023 |
| JP | H07286760 | A | 10/1995 |
| JP | h10510892 | B | 10/1998 |
| JP | 2011052621 | A | 3/2011 |
| JP | 5502006 | B2 | 10/2012 |

(56) References Cited

FOREIGN PATENT DOCUMENTS

| | | | | | |
|---|---|---|---|---|---|
| JP | 5341482 | B | | 11/2013 | |
| JP | 2014202149 | A | | 10/2014 | |
| JP | 2018200027 | A | | 12/2018 | |
| JP | 2020067027 | A | | 4/2020 | |
| NO | 345651 | | | 5/2021 | |
| RU | 2406853 | C2 | | 12/2010 | |
| RU | 2529769 | C2 | | 9/2014 | |
| RU | 2686656 | C1 | | 4/2019 | |
| WO | 2009116873 | A1 | | 9/2009 | |
| WO | 2012079078 | A2 | | 6/2012 | |
| WO | 2012037571 | A3 | | 7/2012 | |
| WO | 2012106020 | A1 | | 8/2012 | |
| WO | WO-2013025640 | A2 | * | 2/2013 | ........... C01B 32/205 |
| WO | 2013120132 | A1 | | 8/2013 | |
| WO | 2013169242 | A1 | | 11/2013 | |
| WO | WO-2015066764 | A1 | * | 5/2015 | .............. F24T 10/30 |
| WO | 2016204287 | A1 | | 12/2016 | |
| WO | 2019161114 | A1 | | 8/2019 | |
| WO | 2020150245 | A1 | | 7/2020 | |
| WO | 2020160500 | A1 | | 8/2020 | |
| WO | 2021046633 | A1 | | 3/2021 | |
| WO | 2021180893 | A1 | | 9/2021 | |
| WO | 2021188547 | A1 | | 9/2021 | |
| WO | 2022043947 | A1 | | 3/2022 | |
| WO | 2021257944 | A9 | | 4/2022 | |
| WO | 2022123626 | A1 | | 6/2022 | |
| WO | 2022170390 | A1 | | 8/2022 | |
| WO | 2022211643 | A1 | | 10/2022 | |
| WO | 2023062279 | A1 | | 4/2023 | |

OTHER PUBLICATIONS

Boehm, R.F et al, Modelling of a Magma Energy Geothermal Power Plant, presented at ASME Winter Annual Meeting, Boston MA, Dec. 1987, SAND-87-0564C, DE88 003793, 11 pages.

Colp, John L., Final Report—Magma Energy Research Project, Sandia Report, Sand82-2377, Unlimited Release, UC-66, prepared by Sandia National Laboratories under contrace DE-AC04-76DP00789, Printed Oct. 1982, 42 pages.

Dunn, “Energy Extraction from Crustal Magma Bodies”; Sandia National Laboratories (1982), p. 1-18; URL: https://osti.gov/servlets/purl/6740186-LNgWIn/.

El Tayeb, “Fabrication, Characterisation and Analysis of Ceria Thin Films and Patterned Nanostructured Deposits for Enhanced Solar-Driven Thermochemical Conversion”; Thesissubmitted in partial fulfillment of the requirement for the degree of doctor of philosophy, Dublin City University (Nov. 2016), p. 1-175.

Elders et al, “Drilling into Magma and the Implications of the Iceland Deep Drilling Project (IDDP) for High-Temperature Geothermal Systems Worldwide”, Geothermics, Jun. 24, 2013, vol. 49, pp. 111-118.

Melting Points of Rocks and Minerals (Year: 2020); https://www.hsc.edu.kw/student/materials/Physics/website/hyperphysicsmodified/hbase/geophys/meltrock.html; downloaded Feb. 3, 2025.

* cited by examiner

SYSTEM AND METHOD FOR MAGMA-DRIVEN THERMOCHEMICAL PROCESSES

CROSS-REFERENCE TO RELATED APPLICATIONS

This application is a continuation of U.S. application Ser. No. 17/976,159, now U.S. Pat. No. 11,918,967, filed on Oct. 28, 2022, which claims priority to U.S. Provisional Application No. 63/405,276, filed on Sep. 9, 2022, entitled "SYSTEM AND METHOD FOR MAGMA-DRIVEN THERMOCHEMICAL PROCESSES", which is hereby incorporated herein by reference in its entirety.

TECHNICAL FIELD

Novel aspects of the present disclosure relate to novel systems and related methods for carrying out thermochemical processes, and more particularly to systems and methods for conducting reactions using thermal energy harnessed directly from a subterranean heat source, such as magma reservoirs.

BACKGROUND

Thermochemical reactions can be carried out to create useful end products such as hydrogen, ammonia, methane, diesel, kerosene, gasoline, and other forms of green fuel. These chemical reactions can be carried out by existing processes. Some of these chemical reactions can only be carried out at elevated temperatures that provide the requisite activation energy. Some of these chemical reactions can be carried out at room temperature, but only economically at elevated temperatures that provide a desired rate of reaction. However, the costs associated with obtaining the elevated temperatures may render these processes economically unfeasible.

SUMMARY

Novel aspects of the present disclosure are directed to a method for carrying out thermochemical processes. The method includes the steps of injecting one or more feed streams into a reaction chamber, maintaining the one or more feed streams in the reaction chamber for a residence time to form one or more product streams from the one or more feed streams, and removing the one or more product streams from the reaction chamber. The reaction chamber is maintained at a reaction temperature using heat obtained directly from a subterranean heat source.

Novel aspects of the present disclosure are also directed to a system for carrying out thermochemical processes. The system includes a wellbore extending from a surface towards a subterranean heat source and a reaction chamber configured to be maintained at a reaction temperature using heat obtained directly from the subterranean heat source. In some embodiments, the reaction chamber includes one or more inlets configured to receive one or more feed streams and one or more outlets configured to expel one or more product streams from the reaction chamber. The one or more product streams are formed from the one or more feed streams in response to maintaining the one or more feed streams within the reaction chamber for a residence time.

Other aspects, embodiments and features of the disclosure will become apparent from the following detailed description when considered in conjunction with the accompanying figures. In the figures, each identical, or substantially similar component that is illustrated in various figures is represented by a single numeral or notation. For purposes of clarity, not every component is labeled in every figure. Nor is every component of each embodiment shown where illustration is not necessary to allow those of ordinary skill in the art to understand the disclosure.

BRIEF DESCRIPTION OF THE FIGURES

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying figures, wherein:

DETAILED DESCRIPTION

Geothermal systems have been proposed to offset the high cost of carrying out thermochemical processes. However, these conventional geothermal systems generate electricity by harnessing steam from production wells that are heated by a renewable, subterranean heat source, powering turbines with the steam to create electricity that is inefficiently stored, then transported over long distances to power a heating apparatus that drives thermochemical processes. The numerous steps for converting geothermal energy into electricity for powering heating apparatuses is inefficient, which increases cost of production of green fuels and other end products. Other forms of renewable energy, such as solar and wind, are unpredictable and inefficient, and still require the various inefficient systems for producing heat and pressure. Fossil fuel systems may be required as a reserve. Other conventional systems that may not require the same elevated temperature requirements may be too expensive to implement on a widespread basis.

Novel aspects of the present disclosure recognize the need for an improved system and method for leveraging renewable geothermal energy for driving thermochemical processes without the unavoidable costs, inefficiencies, and unpredictability of other renewable energy systems and methods. In particular, the improved system and method provide a reaction chamber with heat obtained directly from a subterranean heat source, e.g., a magma body. One or more feed streams introduced into the reaction chamber can use the heat to form end products via thermochemical process.

Exemplary thermochemical processes described in this disclosure include the Haber Bosch process that forms ammonia, the Fischer-Tropsche process that forms tail gasses and liquid hydrocarbons, and the thermochemical splitting of water that forms H2 and O2 gasses from water.

Figure 1A:
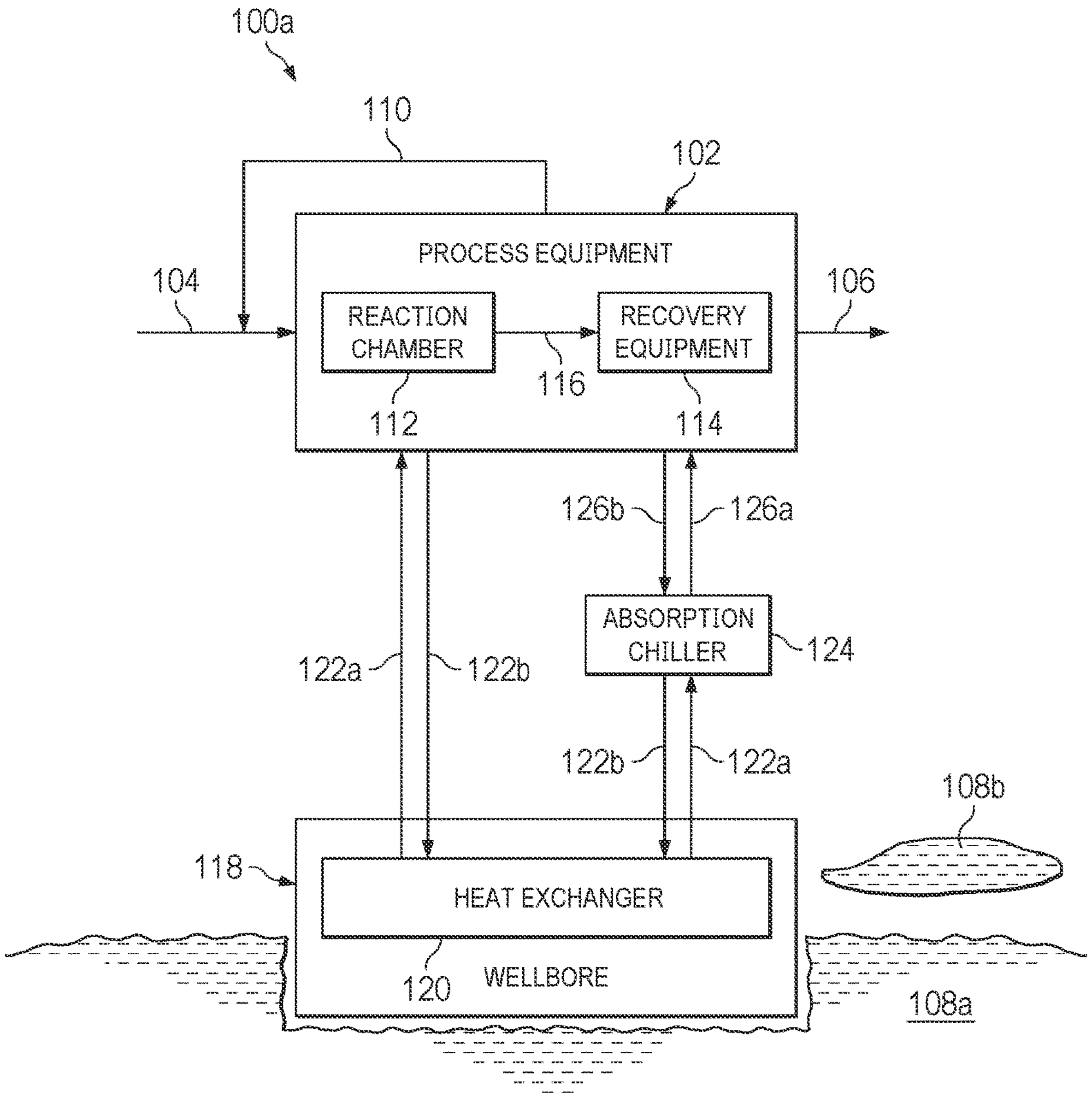
FIG. 1A is a simplified block diagram of a system for conducting thermochemical processes according to an illustrative embodiment.

FIG. 1A is a simplified block diagram of a system for carrying out a thermochemical process according to an illustrative embodiment. Non-limiting examples of thermochemical processes that can be carried out in system 100*a* include Haber Bosch, Fischer-Tropsche, and thermochemical splitting of water.

Generally, system 100*a* includes process equipment 102 arranged to convert one or more feed streams 104 into one or more end product streams 106 by way of a thermochemical process that uses heat obtained directly from a subterranean heat source 108. An optional recycle stream 110 can be fed back into the one or more feed streams 104 to improve efficiency and reduce waste.

The exemplary process equipment 102 depicted in FIG. 1A includes at least a reaction chamber 112. The reaction chamber 112 can be the interior volume of a reactor vessel. The reaction chamber 112 can be operated at higher than ambient temperatures and pressures and for conducting a thermochemical process. The thermochemical process can be a batch process or a continuous process. The reaction chamber 112 is depicted as a single chamber, but in another embodiment, the reaction chamber 112 can include two or more reaction chambers to permit two or more discrete reactions to occur. The multiple reaction chambers can be housed in a single reactor vessel or separately in multiple reactor vessels.

The process equipment 102 can also include optional recovery equipment 114, which can be used to recover one or more end product streams 106. Recovery equipment 114 can be any one or more conventionally known pieces of equipment, such as a distillation column, condenser, stripping column, extraction tower, or other forms of separator vessel. For example, a reaction carried out in reaction chamber 112 can produce an intermediate product stream 116 that includes a gaseous end product as well as unreacted reactants in gaseous form. The intermediate product stream 116 can be conveyed to the optional recovery equipment 114 to be separated into one or more end product streams 106 formed entirely from the desired end product, and one or more recycle streams 110 formed from the unreacted reactants. In another example, a reaction carried out in reaction chamber 112 can produce an intermediate product stream 116 that can be separated out into an optional recycle stream 110 and a plurality of different end product streams 106 using conventional separations techniques.

The reaction chamber 112 is heated by heat obtained directly from a subterranean heat source accessible by a wellbore 118. Wellbore 118 is formed from a borehole and associated structures (not shown), such as casing strings, drill stem, fluid conduit(s), wellhead, and control equipment. The borehole of the wellbore 118 extends from a surface to an underground location selected to be able to provide the requisite amount of heat to provide the reaction chamber 112 with a necessary reaction temperature. The reaction temperature is the amount of heat necessary for a desired thermochemical reaction to occur according to desired parameters. For example, the reaction temperature can be the amount of heat necessary for the desired thermochemical reaction to occur within a predetermined time period, at a selected temperature, using a particular catalyst, etc.

In some embodiments, the requisite amount of heat can be obtained simply by drilling to an adequate depth without regard to the presence of subterranean geological formations. In these embodiments, the subterranean heat source is simply the ambient heat that increases as a function of borehole depth.

In other embodiments, the subterranean heat source is a magma body 108 and the requisite amount of heat can be obtained by drilling the borehole to a particular location based on the presence or proximity of the magma body 108. Magma body 108 is one or more subterranean geological formations that houses magma. Non-limiting examples of magma body 108 can include sills, laccoliths, lopoliths, diapirs, and plutons. In the example in FIG. 1, wellbore 118 is drilled so that the terminal end of its borehole is partially within a magma body 108*a*, e.g., a pluton, and so that the borehole passes past another magma body 108*b*, e.g., a lopolith.

A heat exchanger 120 disposed within the wellbore 118 can harness the heat directly from the subterranean heat source to provide the reaction chamber 112 with the reaction temperature for carrying out a thermochemical process. The heat exchanger 120 can be positioned at the terminal end of the borehole to harness heat from the magma body 108*a* or within the borehole at a predetermined depth proximate to magma body 108*b* to harness heat from the magma body 108*b*. The heat is transferred to a heating fluid 122*a* that is conveyed to the process equipment 102, e.g., reactor vessel housing the reaction chamber 112, to heat the reaction chamber 112. Spent heating fluid 122*b* is returned from the process equipment 102 to the heat exchanger 120 and recycled.

The subterranean heat source can also provide lower-than-ambient temperatures for the thermochemical process carried out in system 100*a* by implementation of an optional absorption chiller 124. The absorption chiller 124 can receive a heating fluid 122*a* from a heat exchanger 120 to form a cooling fluid 126*a* that can be conveyed to process equipment 102, e.g., to recovery equipment 114. The recovery equipment 114 can be a condenser that can condense a gaseous end product into a liquid phase for separation from unreacted reactants in the gaseous phase. Spent cooling fluid 126*b* can be returned to the absorption chiller 124 and reused. Spent heating fluid 122*b* can be returned from the absorption chiller 124 to the heat exchanger 120 and also reused.

Although not depicted in FIG. 1A, a catalyst can be provided to facilitate the thermochemical process. As discussed in more detail in the figures that follow, the catalyst can be located within the reaction chamber 112.

Figure 1B:
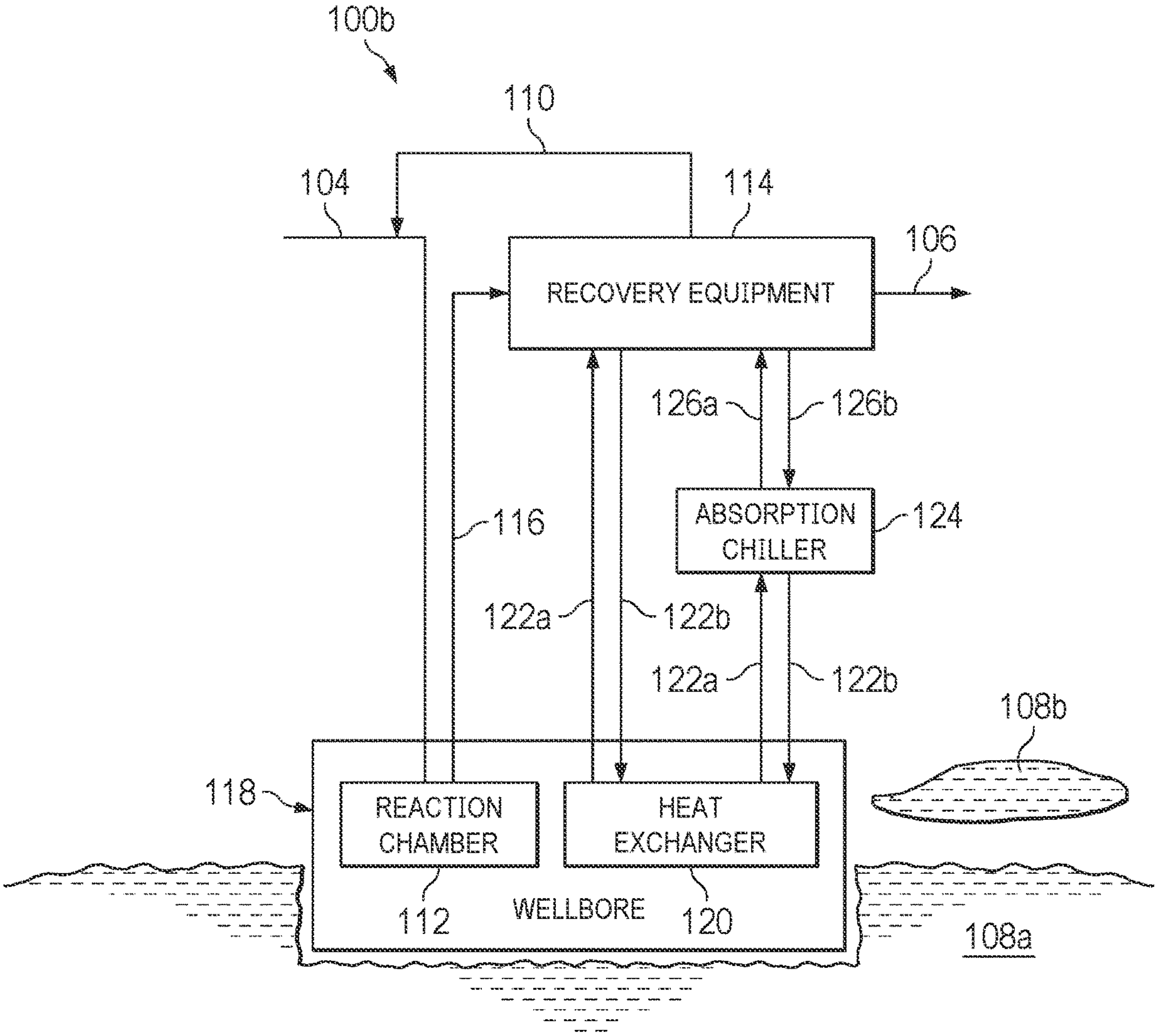
FIG. 1B is a simplified block diagram of another system for conducting thermochemical processes according to an illustrative embodiment.

FIG. 1B is a simplified block diagram of another system for conducting thermochemical processes according to an illustrative embodiment. Non-limiting examples of thermochemical processes that can be carried out in system 100*b* include Haber Bosch, Fischer-Tropsche, and thermochemical splitting of water.

Generally, system 100*b* includes process equipment arranged to convert one or more feed streams 104 into one or more end product streams 106 by way of a thermochemical process that uses heat obtained directly from a subterranean heat source 108. An optional recycle stream 110 can be fed back into the one or more feed streams 104 to improve efficiency and reduce waste.

System 100*b* differs from system 100*a* in that the reaction chamber 112 is located within the wellbore 118 to obtain heat directly from a subterranean heat source, e.g., magma body 108, rather than from a heat exchanger that harnesses the heat used by a reaction chamber located externally to the wellbore 118. In system 100*b*, the reaction chamber 112 can be the interior volume of a reactor vessel that is positioned within the wellbore 118.

In another embodiment, a volume within the wellbore 118 can serve as the reaction chamber 112. In this other embodiment, cased or uncased portions of the wellbore 118 can serve as the reaction chamber 112. Heat is provided to the reaction chamber 112 through the sidewalls of the wellbore 118 and through casing segments when present. The reaction chamber 112 can include additional equipment to increase the residence time of the reactants in the reaction chamber 112 or to promote exposure to a catalyst (not shown). For example, the reaction chamber can include a casing plate (not shown) that at least partially seals an upper end of the reaction chamber 112. The catalyst can be suspended from or otherwise coupled to the casing plate. In addition, or in the alternative, the reaction chamber 112 can house a baffle system (not shown) that promotes mixing and/or increases residence time of reactants in the reaction chamber 112.

Figure 2:
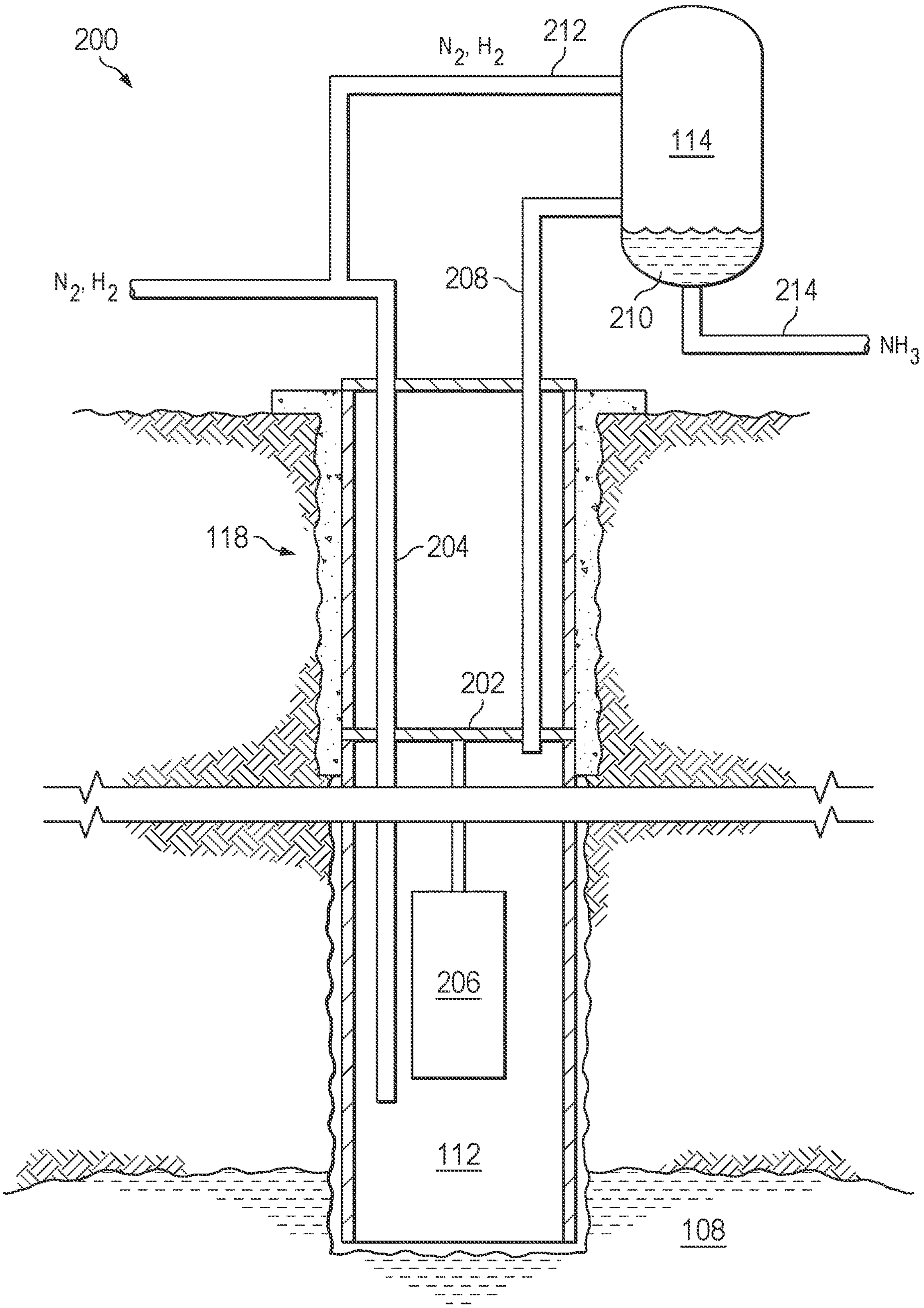
FIG. 2 is a schematic diagram of a first system for forming ammonia via a Haber Bosch process according to an illustrative embodiment.

FIG. 2 is a schematic diagram of a first system for forming a selected end product in a thermochemical process according to an illustrative embodiment. The system 200 can be configured to accommodate a Haber Bosch process to obtain ammonia from one or more feed streams comprised of $N_2$ and $H_2$. The ammonia can be formed in a reaction chamber 112 that is disposed within a wellbore 118 so that reaction chamber 112 can be heated directly by a subterranean heat source. In system 200, the reaction chamber 112 is an uncased portion of the wellbore 118 that obtains heat from magma body 108.

In this illustrative embodiment, the reaction chamber 112 is sealed at its upper end by a casing plate 202 that spans the diameter of the wellbore 118. One or more feed stream conduits 204 extends between one or more reactant sources (not shown) that form the feed stream and the reaction chamber 112. The one or more feed stream conduits 204 can pass through the casing plate 202 and extend into reaction chamber 112 to a predetermined depth. Exposure of the reactants to heat obtained directly from a subterranean heat source, e.g., magma body 108, and catalyst 206 causes at least some of the reactants to combine and form an intermediate product stream carried out of the reaction chamber 112 via one or more intermediate product stream conduits 208.

The intermediate product stream is conveyed into recovery equipment 114, which is a condenser in the system 200 depicted in FIG. 2. The condenser 114 separates the intermediate product stream into an unreacted reactant fraction that is fed back into the reaction chamber 112 via recycle stream conduit 212, and a liquid phase end product fraction 210 that is extracted from the condenser 114 by end product stream conduit 214. When system 200 is configured to produce ammonia by the Haber Bosch process, the feed stream includes $N_2$ and $H_2$ that is converted into an $NH_3$ end product according to the following equation: $N_2+3H_2\rightarrow 2NH_3$.

In this illustrative embodiment, the catalyst 206 is depicted as generally suspended from the casing plate 202. In a particular example of this embodiment, the casing plate 202 can be configured with a series of baffles (not shown) coupled to the casing plate 202 and having external surfaces coated with a layer of catalyst 206. In another particular example of this embodiment, the casing plate can include a plurality of elongated members extending towards the terminal end of the borehole, each of which includes an external surface coated with a layer of catalyst 206.

Figure 3:
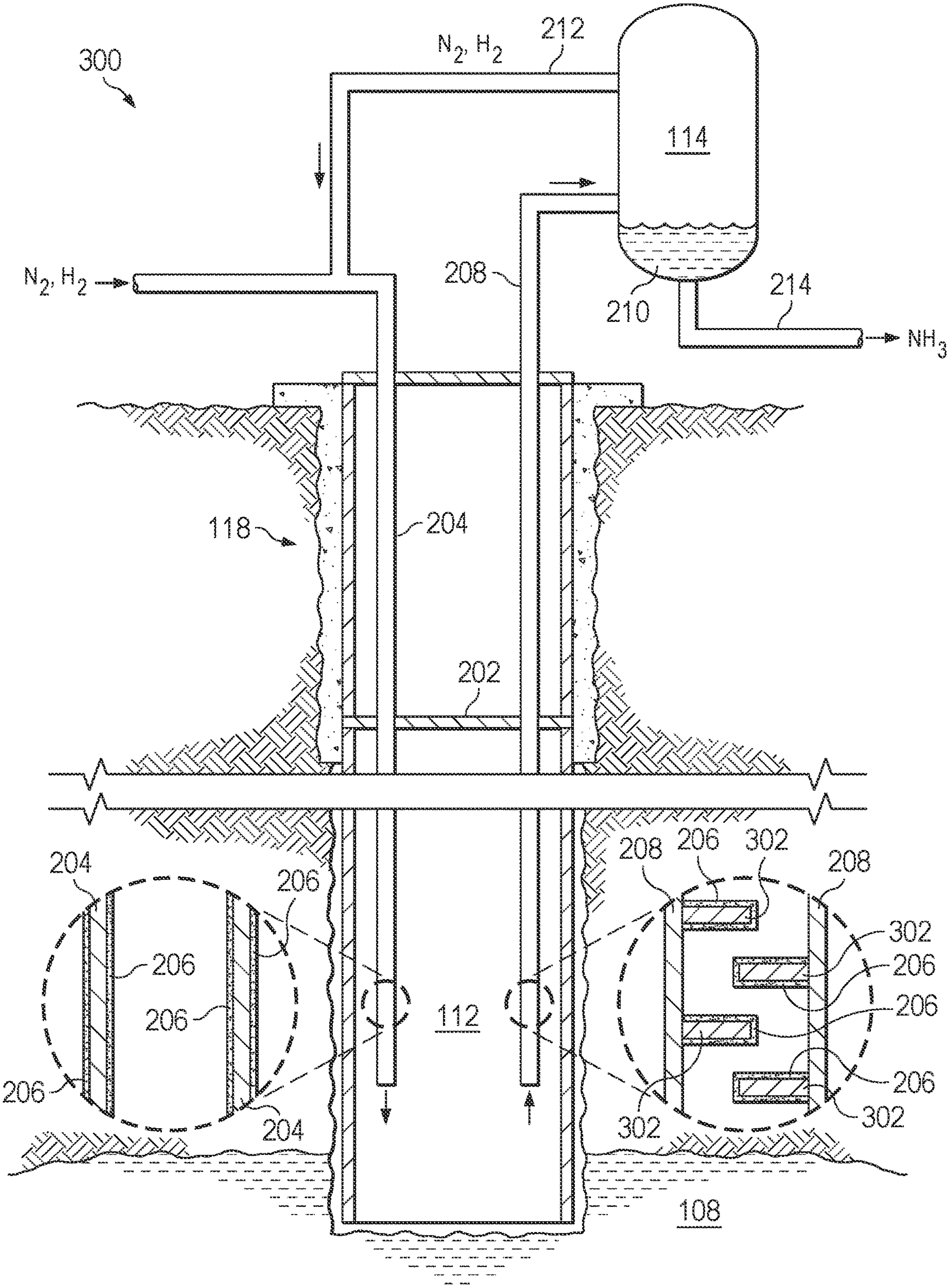
FIG. 3 is a schematic diagram of second system for forming ammonia via a Haber Bosch process according to an illustrative embodiment.

FIG. 3 is a schematic diagram of second system for forming a selected end product in a thermochemical process according to another illustrative embodiment. The system 300 is similar to the system 200 in FIG. 2 except that the catalyst 206 is applied to the surfaces of the one or more feed stream conduits 204 and/or the one or more intermediate product stream conduits 208. As an example, the catalyst 206 is shown applied to the inner and outer surfaces of the one or more feed stream conduits 204, and the catalyst 206 is shown applied to baffles 302 attached to the inner surfaces of the intermediate product stream conduits 208. These examples are illustrative and non-limiting.

Figure 4:
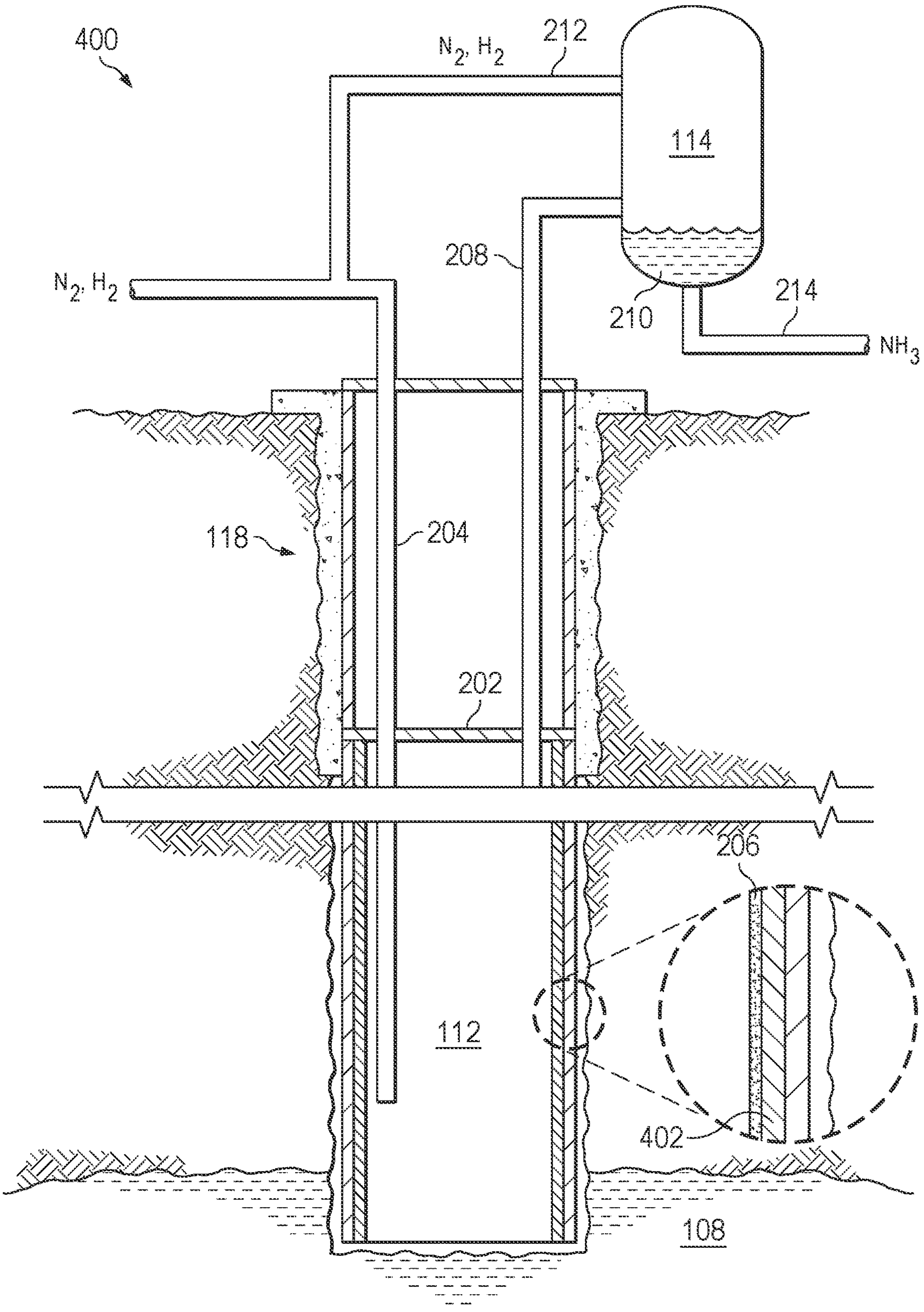
FIG. 4 is a schematic diagram of a third system for forming ammonia via a Haber Bosch process according to an illustrative embodiment.

FIG. 4 is a schematic diagram of third system for forming a selected end product in a thermochemical process according to another illustrative embodiment. The system 400 is similar to the system 200 in FIG. 2 except that the wellbore 118 includes a boiler casing 402 at least partially bounding the reaction chamber 112. The catalyst 206 is shown applied to the inner surfaces of the boiler casing 402. In an alternate embodiment, the catalyst 206 can be applied to features coupled to the inner surface of the boiler casing 402 which extend inwardly into the reaction chamber 112. For example, a honeycomb structure (not shown) spanning a diameter of the wellbore 118 can be attached to the inner surfaces of the boiler casing 402 and covered with catalyst 206. In another example, a baffle system (not shown) can be attached to the inner surfaces of the boiler casing 402 and covered with catalyst 206. These inwardly extending features increases the contact between the reactants in the feed stream and the catalyst 206 in the reaction chamber 112, which promotes conversion to intermediate product(s) and/or end product(s).

Figure 5:
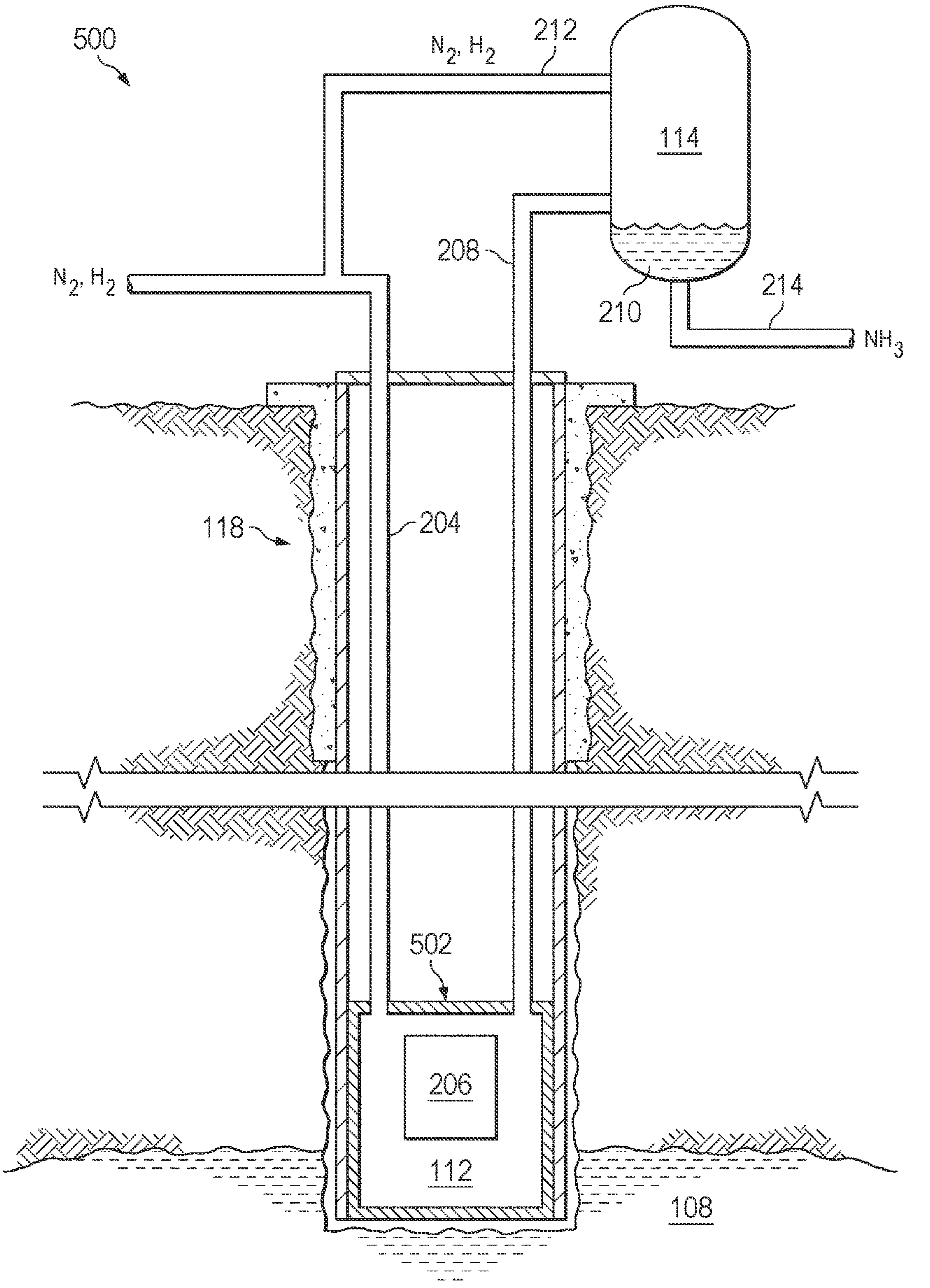
FIG. 5 is a schematic diagram of a fourth system for forming ammonia via a Haber Bosch process according to an illustrative embodiment.

FIG. 5 is a schematic diagram of fourth system for forming a selected end product in a thermochemical process according to another illustrative embodiment. The system 500 is similar to the system 200 in FIG. 2 except that the reaction chamber 112 is housed within a reactor vessel 502 positioned at the terminal end of the wellbore 118. Reactants are conveyed to the reaction chamber by the one or more feed stream conduits 204. The reactants are converted to intermediate product(s) and/or end products(s) in the presence of heat obtained directly from the magma body 108 and the catalyst 206.

Figure 6:
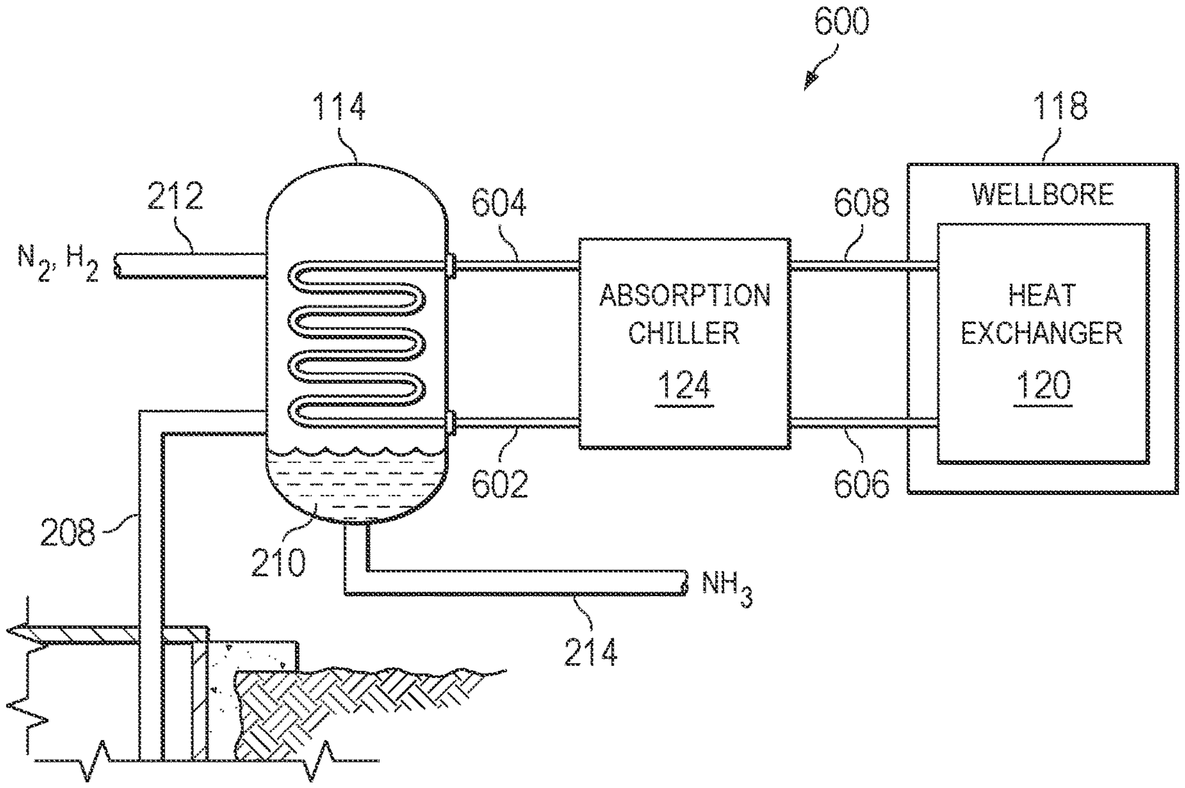
FIG. 6 is a more detailed view of product recovery equipment of a Haber Bosch process according to an illustrative embodiment.

FIG. 6 is a more detailed view of product recovery equipment in a system for forming a selected end product in a thermochemical process according to an illustrative embodiment. The recovery equipment 114 is a condenser that receives an intermediate product stream from one or more intermediate product stream conduits 208. The condenser receives cooling fluid from cooling fluid conduit 602 which can be used to separate a desired end product, such as ammonia, from unreacted reactants in processes that are known to those having ordinary skill in the art. The unreacted reactants are returned back to the reaction chamber via recycle stream conduit 212 and the end product 210 is collected in the condenser 114 in liquid form and removed from the condenser 114 in end product stream conduit 214.

The cooling fluid absorbs heat in the condenser 114 and is transformed into spent cooling fluid that is returned to the absorption chiller 124 in spent cooling fluid conduit 604 to be reused. As previously discussed, the absorption chiller 124 uses heat obtained directly from a subterranean heat source, e.g., magma bodies, to form cooling fluid delivered to the condenser 114. The absorption chiller 124 receives heating fluid from heat exchanger 120 via heating fluid conduit 606 and returns spent heating fluid to the heat exchanger 120 via spent heating fluid conduit 608 to form a continuous circuit, as described in more detail in FIGS. 1A and 1B, above.

Figure 7:
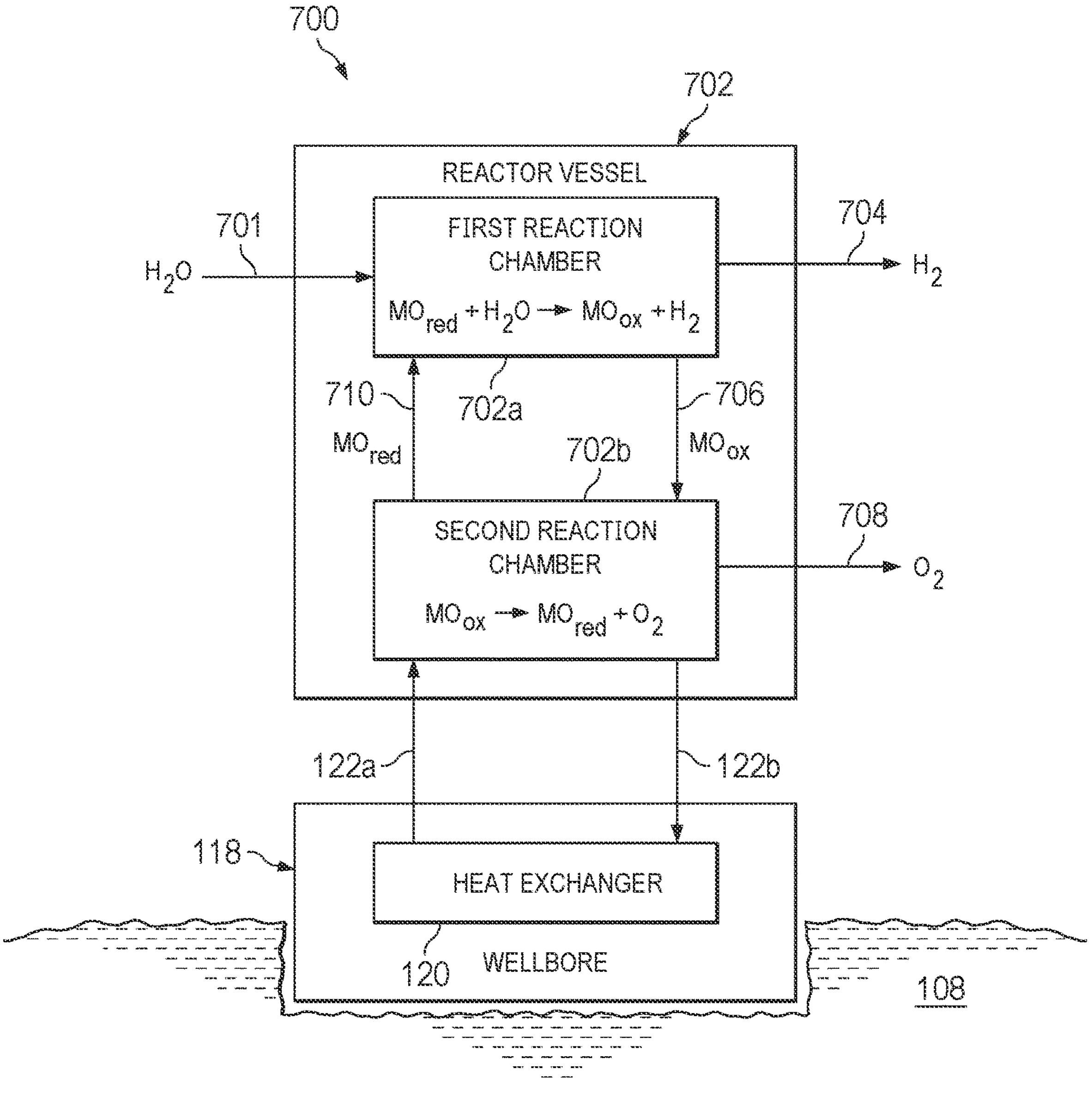
FIG. 7 is a simplified block diagram of a system for thermochemical splitting of water according to an illustrative embodiment.

FIG. 7 is a simplified block diagram of a system for thermochemical splitting of water according to an illustrative embodiment. The thermochemical splitting of water can occur according to any number of conventionally available processes, but the exemplary process described in FIG. 7 is described as a metal oxide redox reaction for the sake of simplicity and consistency. General equations for metal oxide redox reaction for the thermochemical splitting of water includes two steps:

$$MO_{ox} \rightarrow MO_{red} + \frac{1}{2}O_2 \quad \text{EQUATION 1}$$

$$MO_{red} + H_2O \rightarrow MO_{ox} + H_2 \quad \text{EQUATION 2}$$

The first equation represents an endothermic reaction, and the second equation represents an exothermic reaction.

The system 700 includes a reactor vessel 702 that includes a first reaction chamber 702*a* that accommodates an exothermic reaction of the thermochemical splitting process and a second reaction chamber 702*b* that accommodates an endothermic reaction of the thermochemical splitting process. While the reactor vessel 702 is depicted as a single vessel housing reaction chambers 702*a* and 702*b*, in another embodiment the reactor vessel 702 can be formed from two or more separate vessels, each housing one reaction chamber, and located in proximity to one another. Alternatively, the reactor vessel 702 can also be formed from two or more separate vessels located remote from one another, as in the embodiment in which the endothermic reaction of the thermochemical splitting process is carried out in a wellbore as described in more detail below.

Referring back to FIG. 7, heat for the endothermic step is provided by a heat exchanger 120 positioned within a wellbore 118, which can harness heat from a subterranean heat source 108 as previously described in FIG. 1A. In another embodiment, the second reaction chamber 702*b* can be located within the wellbore 118 to obviate the need for the underground heat exchanger 120. As previously described in FIG. 1B, the second reaction chamber can be housed within a reactor vessel positioned within the wellbore 118, or the second reaction chamber 702*b* can be formed from a cased or uncased volume within the wellbore 118.

Referring back to FIG. 7, a water feed stream 701 is provided to the first reaction chamber 702*a* to produce an $H_2$ product stream 704 and an $MO_{ox}$ intermediate product stream 706 that is fed into the second reaction chamber 702*b*. The second reaction chamber 702*b* is heated by heat obtained directly from a subterranean heat source to produce an $O_2$ product stream 708 and an $MO_{red}$ intermediate product stream 710 that is fed back into the first reaction chamber 702*a*. In some embodiments, the heat provided by the subterranean heat source provides the endothermic reaction occurring in the second reaction chamber 702*b* with a reaction temperature of 1,500° C. or higher, which can be easily achieved when the reaction chamber 702*b* is located within the wellbore 118.

Although not shown, the $H_2$ product stream 704 can be fluidically coupled to a system for generating ammonia from $H_2$ and $N_2$ feed streams, such the improved Haber Bosch systems 200, 300, and 400 in FIGS. 2, 3, and 4, respectively. Additionally, the $H_2$ product stream 704 can be fluidically coupled to a system for generating hydrocarbon fuels and other chemical products, such as the Fischer-Tropsche systems described in more detail in FIGS. 8 and 9 that follow.

Figure 8:
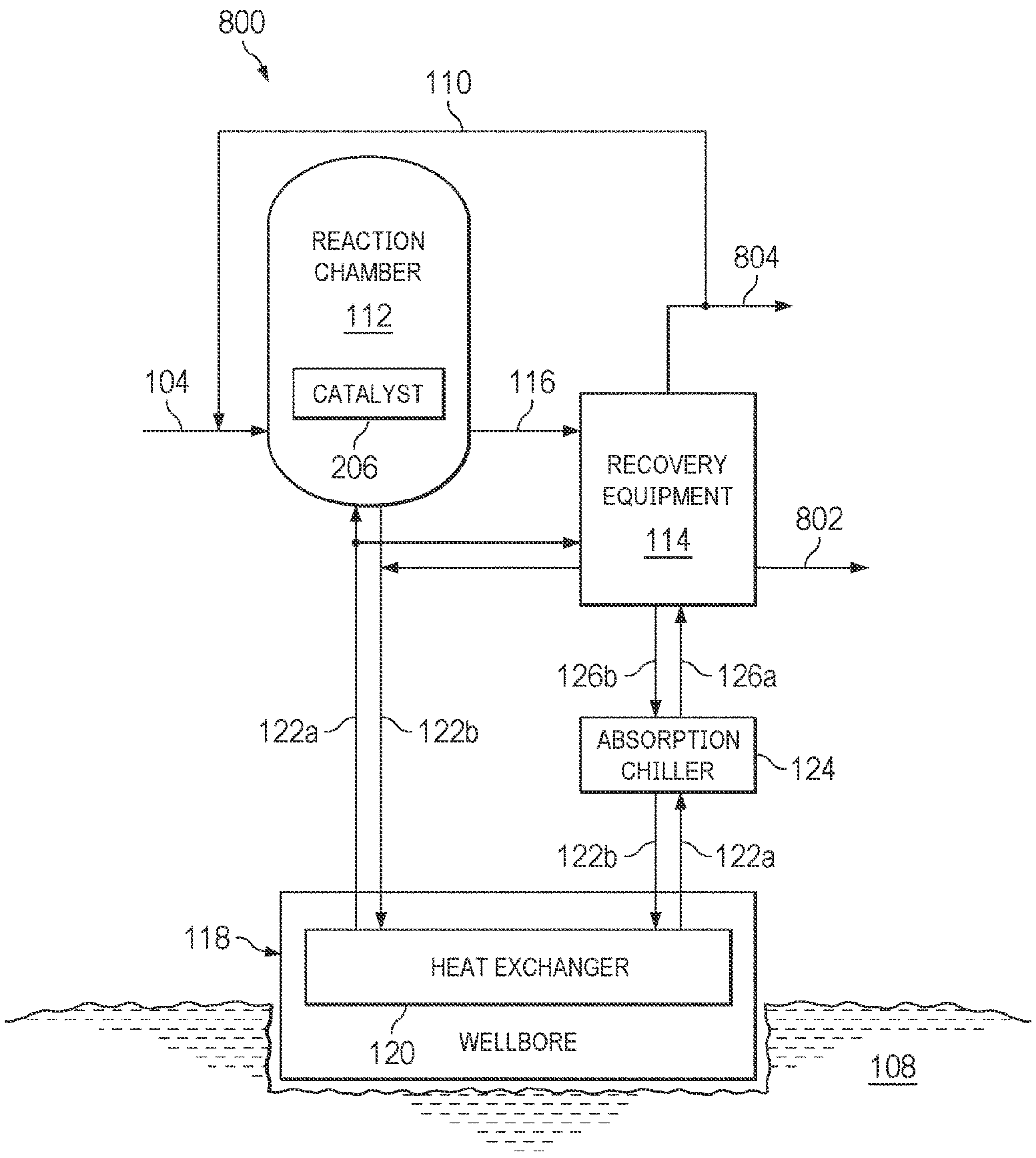
FIG. 8 is a simplified block diagram of a system for forming end products via a Fischer-Tropche process according to an illustrative embodiment.

FIG. 8 is a simplified block diagram of a system for forming end products via a Fischer-Tropche process according to an illustrative embodiment. The Fischer-Tropsche (FT) process is a catalytic chemical reaction that converts a synthesis gas, i.e., syngas, containing carbon monoxide (CO) and hydrogen (H2) into hydrocarbons of various molecular weights. Some of the principal FT synthesis reactions include the following:

Alkane synthesis: $nCO + (2n+1)H_2 \longrightarrow C_nH_{2n+2} + nH_2O$;

Alkene synthesis: $nCO + (2n)H_2 \longrightarrow C_nH_{2n} + nH_2O$;

Alcohol production: $nCO + (2n)H_2 \longrightarrow C_nH_{2n+1} + (n-1)H_2O$; and Water gas shift reaction: $CO + H_2O \longrightarrow CO_2 + H_2$.

System 800 produces one or more liquid-phase end products 802 and one or more gas-phase end products 804 from a syngas feed stream 104. The syngas feed stream 104 is supplied to a FT reactor housing a reaction chamber 112 heated to a reaction temperature by heat obtained directly from a subterranean heat source, such as magma body 108. The FT reactor can be any conventional FT reactor, such as a multi-tubular reactor, fixed-bed reactor, an entrained flow reactor, a slurry reactor, or a circulating fluidized bed reactor.

The intermediate product 116 extracted from the reaction chamber 112 can be processed by recovery equipment 114 to obtain the one or more liquid-phase end products 802 and the one or more gas-phase end products 804 using conventional processing techniques, but with heating provided by the subterranean heat source, and with cooling provided by an absorption chiller that is powered by the subterranean heat source.

In the exemplary system 800, heat is provided to the reaction chamber 112 from a heat exchanger 120 that obtains heat directly from a subterranean heat source, such as magma body 108. The heat is harnessed by heating fluid 122*a* that is conveyed to the reaction chamber 112 and then recycled back to the heat exchanger 120 for reuse. The heating fluid 122*a* can also be conveyed to an absorption chiller 124 that can use the heating fluid 122*a* to provide a cooling fluid 126*a* in ways that are known to those skilled in the art. The heating fluid 122*a* can also be conveyed directly to pieces of recovery equipment 114 to facilitate processing of the intermediate stream 116. The spent heating fluid 122*b* is returned to the heat exchanger 120 for reuse. The cooling fluid 126*a* can be used to reduce temperatures within various pieces of recovery equipment 114 for facilitating processing of the intermediate product 116 into the liquid-phase end products 802 and the gas-phase end products 804. Spent cooling fluid 126*b* is returned to the absorption chiller 124 for reuse.

Examples of recovery equipment 114 can include flash drums, hydrocrackers, and separators. Variation in the process conditions, i.e., catalyst type, temperature, unit operations, molecular sieves, etc., can produce higher molecular weight hydrocarbons recovered in the liquid-phase end products 802, such as hydrocarbon liquid fuels. The gas-phase end products 804 can be extracted from the system 800 or returned back to the Fischer Tropsche reactor in recycle stream 110.

Figure 9:
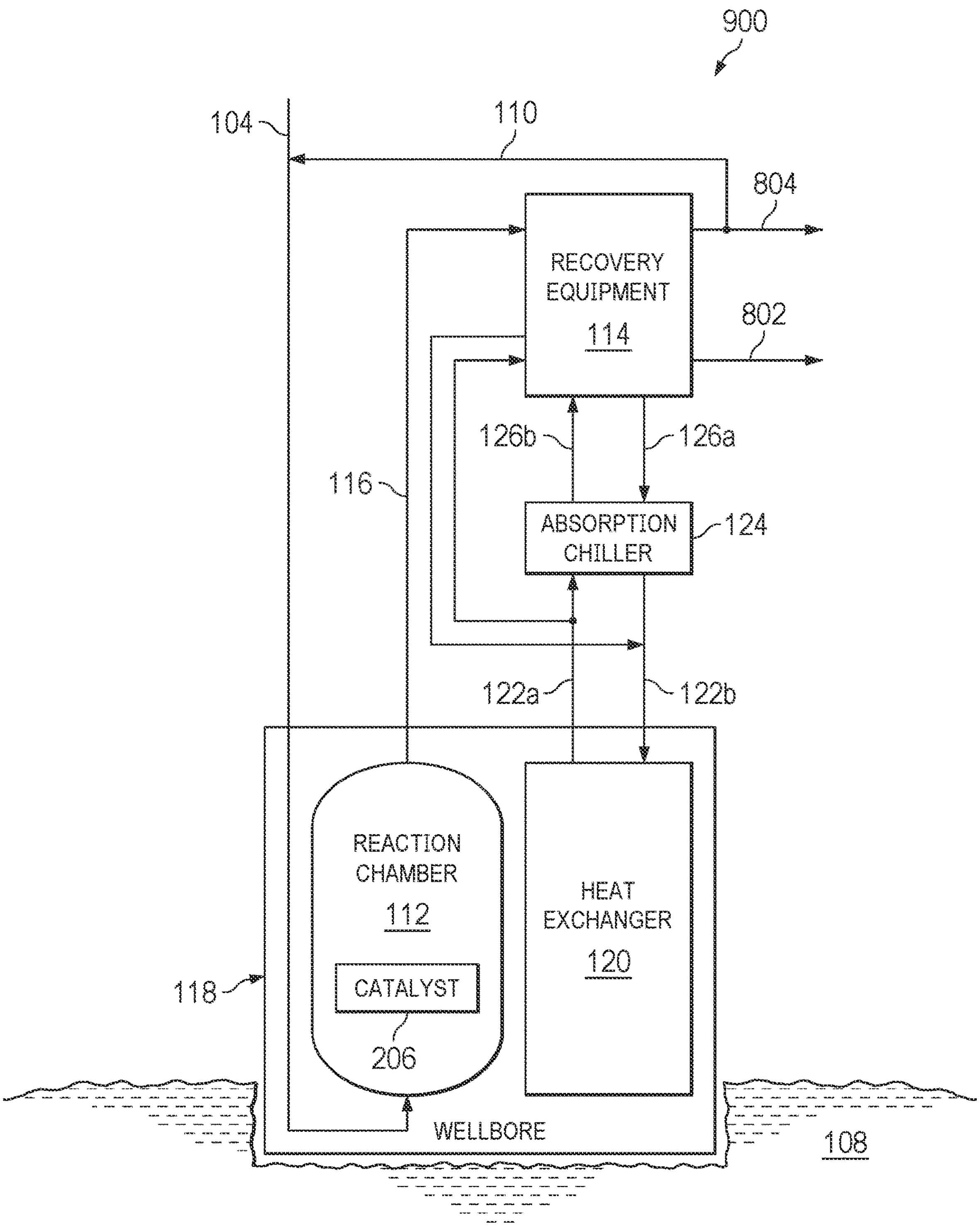
FIG. 9 is a simplified block diagram of a system for forming end products via a Fischer-Tropche process according to an illustrative embodiment.

FIG. 9 is a simplified block diagram of a system for forming end products via a Fischer-Tropche process according to an illustrative embodiment. The system 900 is like system 800 in FIG. 8 except that the FT reactor housing the reaction chamber 112 is disposed within the wellbore 118 to obtain heat directly from the subterranean heat source, such as magma body 108. System 900 can still include a heat exchanger 120 to provide heat to various pieces of recovery equipment 114 to facilitate processing of the intermediate stream 116, or to the absorption chiller 124 so that cooling fluid 126*a* can be provided to pieces of recovery equipment 114 as previously discussed.

Figure 10:
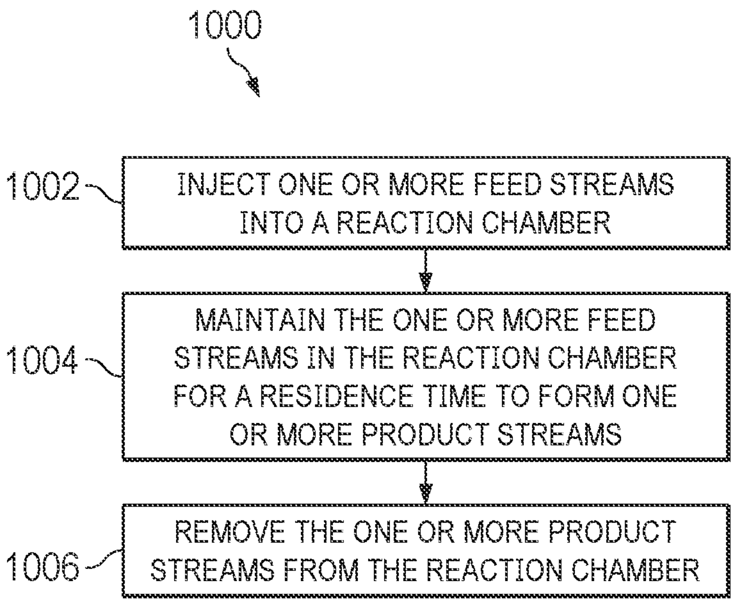
FIG. 10 is a flowchart of a process for carrying out a thermochemical process according to an illustrative embodiment.

FIG. 10 is a flowchart of a process for carrying out a thermochemical process according to an illustrative embodiment. The steps in flowchart 1000 can be carried out in a system, such as systems 100*a* and 100*b* in FIGS. 1A and 1B, or in the various systems described in FIGS. 2-9.

Flowchart 1000 begins at step 1002 by injecting one or more feed streams into a reaction chamber, such as reaction chamber 112. The reaction chamber is maintained at a reaction temperature using heat obtained directly from a subterranean heat source. An example of the subterranean heat source includes magma body 108.

In step 1004 the one or more feed streams is maintained in the reaction chamber for a residence time to form one product streams from the one or more feed streams that are removed from the reaction chamber in step 1006. The one or more product streams can be an intermediate product stream, such as intermediate product stream 116, which can be further processed to form one or more end product streams, such as end product stream 106, gas-phase end products 804, and/or liquid-phase end products 802. The one or more product streams can also be an end product stream that does not require further processing, such as product stream 704 and/or product stream 708.

Figure 11:
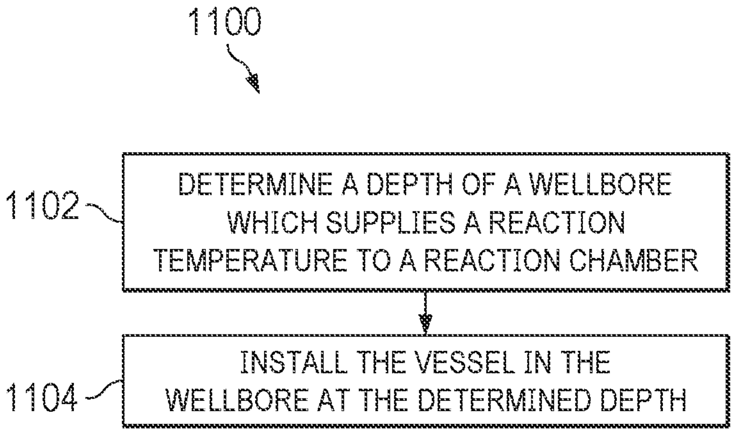
FIG. 11 is flowchart of a process for installing a vessel for use in a process for carrying out a thermochemical process according to an illustrative embodiment.

FIG. 11 is flowchart of a process for installing a vessel for use in a process for carrying out a thermochemical process according to an illustrative embodiment. Flowchart 1100 begins at step 1102 by determining a depth of the wellbore supplying a reaction temperature to the reaction chamber. In step 1104, the vessel is installed within the wellbore at the determined depth. Once the vessel has been installed within the wellbore, then the steps of flowchart 1100 can be carried out to form one or more product streams from one or more feed streams injected into the reaction chamber.

Figure 12:
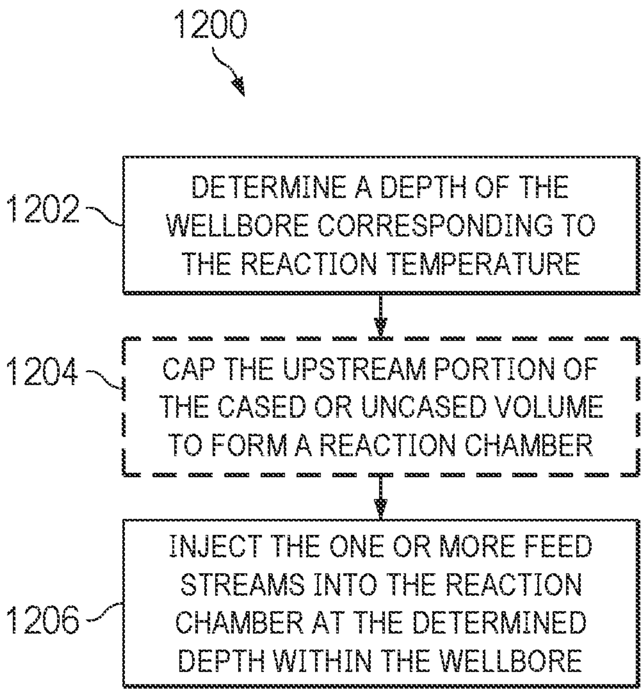
FIG. 12 is a flowchart of a more detailed process for injecting one or more feed streams into a reaction chamber according to an illustrative embodiment.

FIG. 12 is a flowchart of a more detailed process for injecting one or more feed streams into a reaction chamber according to an illustrative embodiment. The steps in flowchart 1200 can be carried out in step 1002 in FIG. 10 when the reaction chamber is a cased or uncased volume within the wellbore.

Flowchart 1200 begins at step 1202 by determining a depth of the wellbore corresponding to the reaction temperature. In an optional step 1204, the upstream portion of the cased or uncased volume is capped by a casing plate to form a reaction chamber. In step 1206, the one or more feed streams are injected into the reaction chamber at the determined depth within the wellbore.

Figure 13:
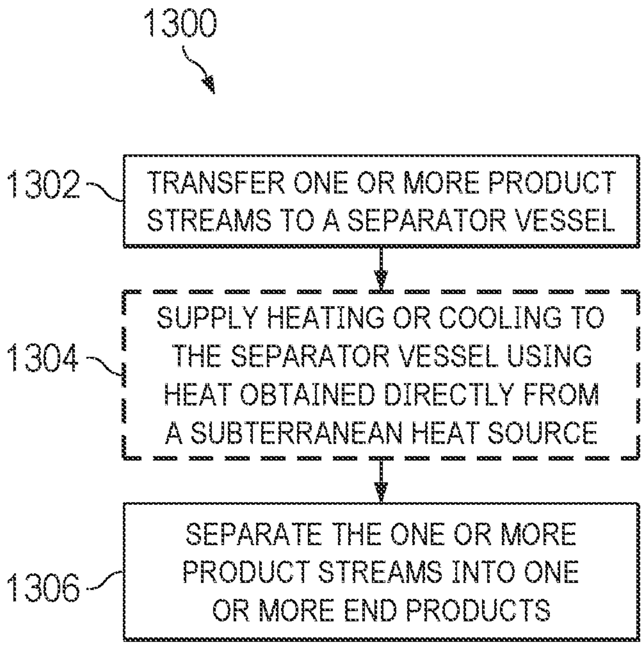
FIG. 13 is a flowchart of a process for processing a product stream formed by a thermochemical process according to an illustrative embodiment.

FIG. 13 is a flowchart of a process for processing a product stream formed by a thermochemical process according to an illustrative embodiment. Steps of flowchart 1300 can be implemented following the removing step 1006 in FIG. 10.

Flowchart 1300 begins at step 1302 by transferring the one or more product streams to a separator vessel. Depending upon the type of the separator vessel and the type of separations process implemented, the separator vessel can be heated by heating fluid that obtained its heat directly from a subterranean heat source or cooled by cooling fluid formed by heating fluid that obtained its heat directly from the subterranean heat source. Thus, flowchart 1300 includes the optional step 1304 of supplying heating or cooling to the separator vessel using heat obtained directly from a subterranean heat source. In step 1306, the one or more product streams are separated into one or more end products.

Although embodiments of the disclosure have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. Further, various systems are described herein specific to the Haber Bosch process, the Fischer Tropsche process, and the thermochemical splitting of water, but the novel aspects of this disclosure can be applied to other processes in which heat obtained directly from a subterranean heat source can be used to drive thermochemical reactions.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this disclosure has been particularly shown and described with reference to preferred embodiments, it will be understood by those skilled in the art that various changes in form and detail may be made therein without departing from the spirit and scope of the disclosure. The inventors expect skilled artisans to employ such variations as appropriate, and the inventors intend the disclosed systems and methods to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Additional Embodiments

The following descriptive embodiments are offered in further support of the novel aspects of this disclosure.

In a first embodiment, novel aspects of the present disclosure are directed to a method for carrying out a thermochemical process. The method includes the step of injecting one or more feed streams into a reaction chamber. The reaction chamber can be maintained at a reaction temperature using heat obtained directly from a subterranean heat source. The method also includes the steps of maintaining the one or more feed streams in the reaction chamber for a residence time to form one or more product streams from the one or more feed streams and removing the one or more product streams from the reaction chamber.

In another aspect of the first embodiment, the method includes the step of injecting one or more feed streams into a reaction chamber. The reaction chamber can be maintained at a reaction temperature using heat obtained directly from a subterranean heat source. The method also includes the steps of maintaining the one or more feed streams in the reaction chamber for a residence time to form one or more product streams from the one or more feed streams and removing the one or more product streams from the reaction chamber. The method also includes one or more limitations selected from the following list:

- wherein the reaction chamber is housed within a vessel disposed within a wellbore;
- determining a depth of the wellbore supplying the reaction temperature to the reaction chamber, and installing the vessel within the wellbore at the determined depth;
- wherein the vessel is located at least partially within a magma reservoir;
- wherein the reaction chamber is a cased or uncased volume within the wellbore;
- determining a depth of the wellbore corresponding to the reaction temperature, and injecting the one or more feed streams into the reaction chamber at the determined depth within the wellbore;
- capping an upstream portion of the uncased volume with a plate to form the reaction chamber, wherein the one or more feed streams is injected through an inlet of the plate, and wherein the one or more product streams is removed from an outlet of the plate;
- wherein the reaction chamber is located externally to a wellbore, and wherein the heat is supplied to the reaction chamber from a heat exchanger disposed at a depth within the wellbore to supply heating fluid to heat the reaction chamber to the reaction temperature;
- transferring the one or more product streams to a separator vessel, and separating the one or more product streams into one or more end products;
- supplying at least some of the heat to an absorption chiller to form a cooling fluid, and cooling the separator vessel with the cooling fluid form the one or more end products; and
- wherein maintaining the one or more feed streams in the reaction chamber for a residence time to form one or more product streams from the one or more feed streams further comprises exposing the one or more feed streams to a catalyst in the reaction chamber.

In a second embodiment, novel aspects of the present disclosure are directed to a system for carrying out thermochemical processes. The system includes a wellbore extending from a surface towards a subterranean heat source and a reaction chamber configured to be maintained at a reaction temperature using heat obtained directly from the subterranean heat source. In some embodiments, the reaction chamber includes one or more inlets configured to receive one or more feed streams and one or more outlets configured to expel one or more product streams from the reaction chamber. The one or more product streams are formed from the one or more feed streams in response to maintaining the one or more feed streams within the reaction chamber for a residence time.

In another aspect of the second embodiment, the system includes a wellbore extending from a surface towards a subterranean heat source and a reaction chamber configured to be maintained at a reaction temperature using heat obtained directly from the subterranean heat source. In some embodiments, the reaction chamber includes one or more inlets configured to receive one or more feed streams and one or more outlets configured to expel one or more product streams from the reaction chamber. The one or more product streams are formed from the one or more feed streams in response to maintaining the one or more feed streams within the reaction chamber for a residence time. The system also includes one or more limitations selected from the following list:

- a vessel disposed within the wellbore, wherein the reaction chamber is housed within the vessel;
- wherein the vessel is installed at a depth within the wellbore which provides the reaction chamber with the reaction temperature;
- wherein the vessel is located at least partially within a magma reservoir;
- wherein the reaction chamber is a cased or uncased volume of space within the wellbore;
- wherein the reaction chamber includes a cap spanning an upstream portion of the cased or uncased volume of space;
- a first set of fluid conduits extending through the wellbore which brings the one or more feed streams to the reaction chamber, and a second set of fluid conduits extending through the wellbore which removes the one or more product streams from the reaction chamber;
- wherein the reaction chamber is a vessel located externally to a wellbore, and wherein system further comprises a heat exchanger disposed at a depth within the wellbore to supply a heating fluid to the vessel to heat the reaction chamber to the reaction temperature;
- a separator vessel coupled to the reaction chamber, wherein the separator vessel separates the one or more product streams into one or more end products;
- a heat exchanger disposed at a depth within a wellbore to supply a heating fluid, and an absorption chiller connected to the heat exchanger, wherein the absorption chiller forms a cooling fluid from the heating fluid, and wherein the separator vessel is cooled with the cooling fluid; and
- wherein the reaction chamber further comprises a catalyst disposed within the reaction chamber.

We claim:

1. A method for carrying out a thermochemical process, the method comprising:

generating a chemical product in a reaction chamber, wherein the reaction chamber is maintained at a reaction temperature using heat obtained from a subterranean heat source;

transferring a product stream comprising the chemical product to a separator vessel;

supplying at least some of the heat obtained from the subterranean heat source to an absorption chiller to form a cooling fluid; and cooling the separator vessel with the cooling fluid to facilitate separation of the chemical product from at least one other component in the product stream.

2. The method of claim 1, wherein the reaction chamber is housed within a vessel disposed within a wellbore.

3. The method of claim 2, further comprising:

determining a depth of the wellbore supplying a reaction temperature sufficient for generating the chemical product to the reaction chamber; and installing the vessel within the wellbore at the determined depth.

4. The method of claim 3, wherein the vessel is located at least partially within a magma reservoir.

5. The method of claim 2, wherein the reaction chamber is a cased or uncased volume within the wellbore.

6. The method of claim 5, further comprising:

determining a depth of the wellbore corresponding to supplying a reaction temperature sufficient for generating the chemical product; and injecting one or more feed streams into the reaction chamber at the determined depth within the wellbore.

7. The method of claim 6, further comprising capping an upstream portion of the cased or uncased volume with a plate to form the reaction chamber, wherein the one or more feed streams is injected through an inlet of the plate, and wherein the product stream is removed from an outlet of the plate.

8. The method of claim 1, wherein the reaction chamber is located externally to a wellbore, and wherein the heat obtained from the subterranean heat source is supplied to the reaction chamber from a heat exchanger disposed at a depth within the wellbore to supply heating fluid to heat the reaction chamber to a reaction temperature sufficient for generating the chemical product.

9. The method of claim 1, further comprising:

maintaining one or more reactants in the reaction chamber for a residence time to form the chemical product from the one or more reactants; and contacting the one or more reactants to a catalyst in the reaction chamber.

10. A system, comprising:

a heat exchanger disposed at a depth within a wellbore extending into a subterranean heat source and configured to supply a heating fluid;

an absorption chiller connected to the heat exchanger and configured to generate a cooling fluid using the heating fluid supplied by the heat exchanger; and a separator vessel coupled to a reaction chamber, the separator vessel configured to cool a product stream of the reaction chamber using the cooling fluid generated by the absorption chiller, thereby separating the product stream into one or more end products.

11. The system of claim 10, further comprising a vessel disposed within the wellbore, wherein the reaction chamber is housed within the vessel.

12. The system of claim 11, wherein the vessel is installed at a depth within the wellbore which provides the reaction chamber with a reaction temperature sufficient to generate a chemical product present in the product stream.

13. The system of claim 12, wherein the vessel is located at least partially within a magma reservoir.

14. The system of claim 10, wherein the reaction chamber is a cased or uncased volume of space within the wellbore.

15. The system of claim 14, wherein the reaction chamber includes a cap spanning an upstream portion of the cased or uncased volume of the space within the wellbore.

16. The system of claim 10, further comprising:

a first set of fluid conduits extending through the wellbore, wherein the first set of fluid conduits is configured to facilitate flow of one or more feed streams to the reaction chamber; and a second set of fluid conduits extending through the wellbore, wherein the second set of fluid conduits is configured to facilitate flow of the product stream from the reaction chamber.

17. The system of claim 10, wherein:

the reaction chamber is a vessel located externally to the wellbore; and the system further comprises a heat exchanger disposed at a depth within the wellbore, the heat exchanger configured to generate a heating fluid that is provided to the vessel to heat the reaction chamber to a reaction temperature sufficient to generate a chemical product present in the product stream.

18. A method for carrying out a thermochemical process, the method comprising:

determining a depth of a wellbore corresponding to a reaction temperature;

injecting one or more feed streams into a reaction chamber at the determined depth within the wellbore, wherein the reaction chamber is maintained at the reaction temperature using heat obtained from a subterranean heat source, wherein the reaction chamber comprises an uncased volume within the wellbore; and removing the one or more product streams from the reaction chamber.

19. The method of claim 18, further comprising capping an upstream portion of the uncased volume of the wellbore with a plate to form the reaction chamber.

20. The method of claim 19, wherein the one or more feed streams is injected through an inlet of the plate, and wherein the one or more product streams is removed from an outlet of the plate.

* * * * *